Figure 1:
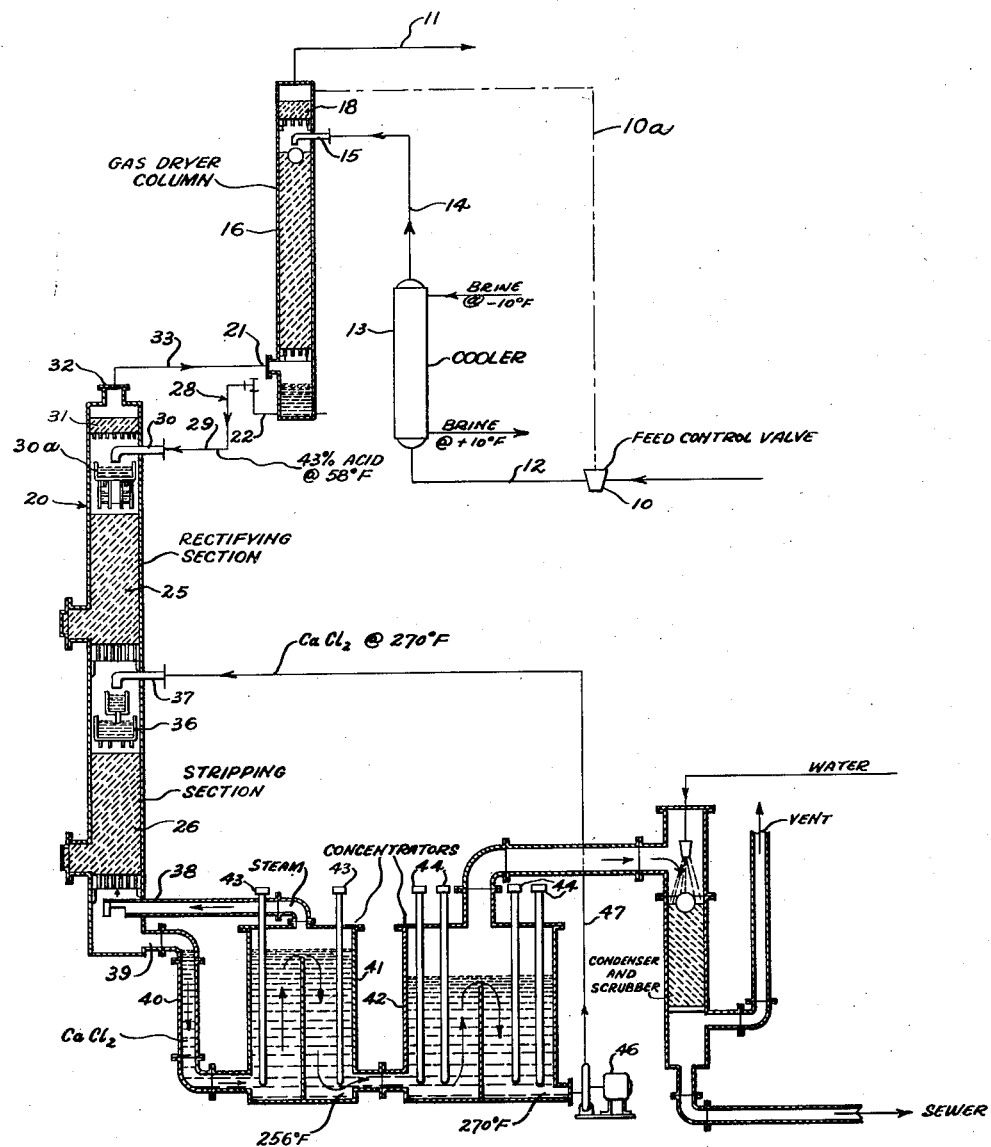

Sept. 25, 1956 C. A. RAUH 2,764,532

PROCESS FOR PRODUCING ANHYDROUS HYDROGEN CHLORIDE GAS

Filed March 30, 1951 2 Sheets-Sheet 1

INVENTOR.
CORNELIUS A. RAUH

BY Albert R. Gobrick

ATTORNEY

Sept. 25, 1956     C. A. RAUH     2,764,532
PROCESS FOR PRODUCING ANHYDROUS HYDROGEN CHLORIDE GAS
Filed March 30, 1951     2 Sheets-Sheet 2

INVENTOR.
CORNELIUS A. RAUH
BY Albert R. Golrick
ATTORNEY

United States Patent Office 2,764,532
Patented Sept. 25, 1956

2,764,532

PROCESS FOR PRODUCING ANHYDROUS HYDROGEN CHLORIDE GAS

Cornelius A. Rauh, Akron, Ohio

Application March 30, 1951, Serial No. 218,373

5 Claims. (Cl. 202—40)

The present invention relates to the production of anhydrous hydrogen chloride gas, particularly to improvement in the production of anhydrous hydrogen chloride from aqueous solutions of the gas. Several methods of producing anhydrous hydrogen chloride have been proposed or adopted in the past, all of which, however, have suffered some disadvantage in the lack of uniformity of the product and difficulty with the process control, or in high cost in equipment installation or maintenance, or in high operating costs due to high power consumption or losses of hydrogen chloride gas or other process materials.

One process which has been used introduced muriatic acid, that is, an aqueous solution of hydrogen chloride, into a packed tower between a lower stripping section filled with a permanent packing and an upper dehydrating section filled with solid calcium chloride in pebble form, the pebbles being introduced at the top as needed to maintain the packing depth. Steam was passed upwardly through the lower section countercurrently to a descending flow of the muriatic acid mixed with an aqueous solution of calcium chloride descending from the upper drying section of the tower, whereby the hydrogen chloride gas was stripped from the muriatic acid. The hydrogen chloride gas with water vapor issuing from the top of the stripper section was dried in passing through the calcium chloride in the upper section of the tower to give anhydrous hydrogen chloride gas at the top of the tower. The calcium chloride solution formed in the drier section of the tower passed downward through the stripping section as a mixture with the muriatic acid to be stripped and finally was delivered from the bottom of the tower to a neutralizing vessel, where calcium carbonate or slaked lime, Ca(OH)$_2$, was used to neutralize the unstripped hydrochloric acid. The neutralized solution then was passed through a drying kiln to produce pebbles of solid calcium chloride, which were returned to the top of the dehydrating tower to be introduced there as required. This process proved erratic in operation, it being very difficult to keep the air moisture from the anhydrous calcium chloride pebbles. Also there were high hydrogen chloride losses through neutralization of the incompletely stripped tower bottom effluent.

Another process similar to that just described uses a packed tower having a lower stripping section and an upper dehydrating section wherein a relatively cool (90° F. to 100° F.) 51% calcium chloride solution is passed over suitable inert packing serves as the dehydrating agent rather than solid calcium chloride pebbles. As before, the muriatic acid is introduced between the stripping and dehydrating sections. The wet hydrogen chloride rising from the lower stripping section passes into the bottom of the dehydrating section and flows upwardly countercurrently to the descending flow of cool calcium chloride solution. The gas issuing from the calcium chloride dehydrating section is not, however, completely dry and hence it is passed to drying towers wherein sulphuric acid flowing over an inert packing serves as the final dehydrating agent. In this process the calcium chloride solution, as in the previous process, passes from the bottom of the dehydrator and descends through the packed stripper section along with the introduced muriatic acid against a countercurrent of steam. The solution of calcium chloride which is thus obtained at the bottom of the stripper is passed to a vessel where it is neutralized with calcium carbonate and is then passed to evaporators or concentrators for the removal of sufficient water to bring the solution up to the 51% strength. Before being recycled to the top of the stripper section, the calcium chloride solution from the concentrator must be cooled at least to about 90° F. This process, among other disadvantages, has the untoward feature of requiring considerable energy to heat the calcium chloride solution to a high temperature in the concentrators and immediately thereafter requiring considerable cooling to reduce the temperature, and hence the vapor pressure, before introduction to the dehydrator. Also, considerable amounts of hydrogen chloride may be lost in the stripper bottoms which pass to the neutralizing vessel. Further, some hydrogen chloride is lost to the sulphuric acid absorbing medium in the final drying towers which cannot be economically recovered, while sulphur trioxide is lost in the operation of concentrating the sulphuric acid for re-use.

Another process producing anhydrous hydrogen chloride from aqueous solutions by the use of sulphuric acid as a dehydrating agent is dependent, however, upon the availability of a stream of waste or by-product hydrogen chloride gas. A stream of by-product hydrogen chloride, which may contain considerable air or inert gases and water vapor, is passed into an absorbing tower where it meets a counterflow of cool re-cycled 21% acid produced at another point in the process. By absorption in the re-cycled acid, the hydrogen chloride is separated from the inert gases which leave the top of the absorber tower. From the bottom of the absorber hydrochloric acid is removed at about 35% concentration (by weight). This 35% acid is pumped to the top of a packed stripping column wherein it meets a countercurrent of steam flowing through the packing. From the top of this packed stripping section, a stream of wet hydrogen chloride gas passes to a cooling section of the tower which effects some removal of water vapor by condensation to give a hydrogen chloride gas stream containing about 2% water. This wet stream of hydrogen chloride is then fed into packed sulphuric acid drying towers to produce the anhydrous gas. From the bottom of the stripping section (or column) a 21% hydrogen chloride solution is re-cycled to the absorber previously mentioned wherein the acid concentration is again built up to a 32%–35% weight concentration. As the solution flowing from the bottom of the stripping column contains as large a quantity as 21% of hydrogen chloride, and so cannot ordinarily be economically released from the process, the utility of this process depends upon having a stream of hydrogen chloride gas available for building up the concentration of the stripper bottom solution for re-cycling. As the solution flowing from the bottom of the stripping section must be cooled before passing to the absorber unit in order to obtain efficient absorption of hydrogen chloride and also to attain the requisite concentration, the process necessarily involves alternately heating large quantities of the acid solution in the stripper section and then cooling the same before returning it to the absorber. Here, of source, considerable operating cost is entailed in the alternate heating and cooling.

The process of this invention proposes important advances over the prior art. Hot calcium chloride solution of from 51%–57% concentration (by weight) and a muriatic acid solution to be stripped are introduced together at the head of a packed stripping section to descend countercurrently to a rising current of steam. The calcium chloride reduces the solubility of the hydrogen chloride gas in the aqueous solutions thereby facilitating the stripping action. Further, the calcium chloride solution is not cooled in passing from the concentrators to the top of the stripping section and hence the hot calcium chloride solution brings useful heat energy to the stripper, thereby decreasing the amount of steam used in the stripper to that needed to supply heat losses through the walls of the equipment. Hence, as there is no need of cooling the re-cycled calcium chloride as used in this process after it has been re-concentrated, energy wasting successive steps of heating and cooling are avoided. The second feature is the use of refrigerated muriatic acid, at a concentration of about 31.5% (20° Baumé) or more by weight of hydrogen chloride, as a dehydrating agent by cooling the acid solution to about 5° F., for example, in the case of 20° Baumé acid, and then passing the refrigerated solution into the top of a packed dehydrating column to flow countercurrently to an ascending stream of moist hydrogen chloride gas to produce an anhydrous hydrogen chloride gas stream. By refrigerating the acid solution to about 5° F. the vapor pressure of water in a 31.5% muriatic acid solution is so low as to be negligible in the process and hence the refrigerated muriatic acid solution can be made to serve as an efficient gas dehydrating medium. Thus there is no need to concentrate dehydrating agents for re-use, as is necessary when sulphuric acid or solid calcium chloride are used in the dehydrating towers. There can be no loss of hydrogen chloride in the dehydrating agent since any acid solution leaving the refrigerator-dryer system is fed into the rectifier tower section. Further, the disadvantages attendant upon the use of calcium chloride or sulphuric acid with respect to the type of equipment which must be used and the cost of maintenance thereof are also avoided by this dehydrating system.

The above mentioned advances, taken individually or jointly, contribute to the production of anhydrous hydrogen chloride gas from an aqueous solution in a manner economical from the viewpoint of energy requirements, operational losses of materials such as hydrogen chloride, costs of equipment and maintenance. The full advantages of these and other features of my process will be more clearly apparent to those skilled in the art in the course of the following description of the drawings, in which Fig. 1 represents the production of anhydrous hydrogen chloride gas, using both the new gas dehydrating system and the improved calcium chloride solution cycle; and Fig. 2 represents a modified manner of carrying out the process of Fig. 1.

Figure 2:
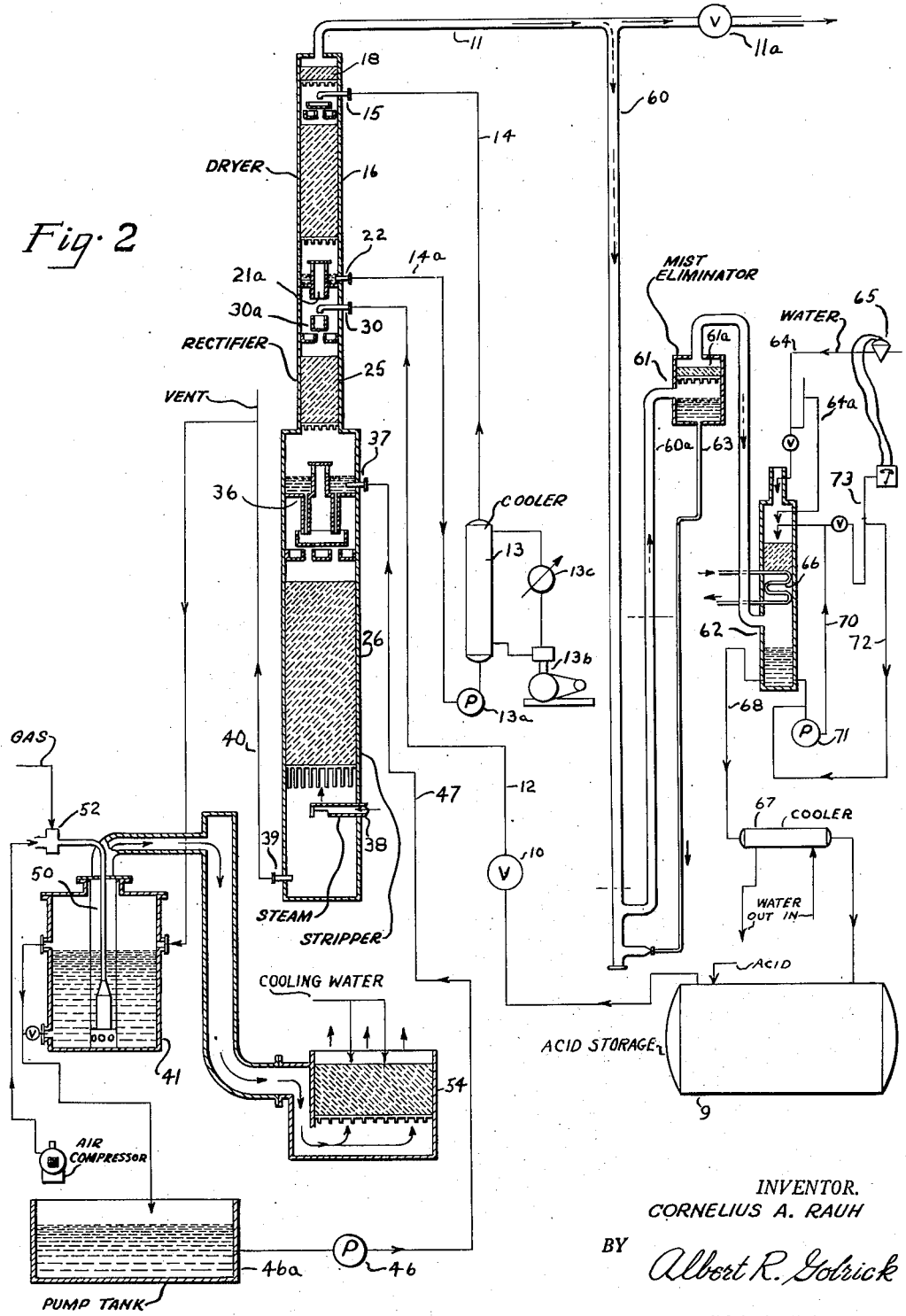

As shown in Fig. 1 of the drawings, the process is carried out in equipment adapted for a nominal production capacity of 325 pounds per hour of anhydrous hydrogen chloride gas from 22° Baumé muriatic acid, that is, from a hydrochloric acid solution containing about 35% by weight hydrogen chloride. The flow of the incoming acid is controlled by the feed control valve 10 which is responsive to the gas pressure of the anhydrous gas product in the product line 11 or at the top of gas drying column 16 as indicated by the dotted line 10a from the valve to the top of column 16. The acid passes through the line 12 to the refrigerating tank or vessel 13 whence it passes through line 14 to the inlet 15 near the top of the gas drying column 16. The inlet 15 preferably is provided with suitable liquid distributing means to ensure even wetting of the packing. The cooler 13 may have as its coolant brine refrigerated to minus 10° F. which leaves the cooler at about 10° F., the capacity of the cooler being sufficient to reduce the temperature of the acid to 10° F. Below the inlet 15 of column 16 there is provided suitable acid resistant packing of a form known to the art, such as Raschig rings, berl saddles, etc., while above the acid inlet a small section of packing 18 is provided as a spray catcher. At the bottom of the tower 16, below the packing, wet hydrogen chloride gas from the top of the combined stripping and rectifying column 20 is introduced through the inlet 21 at a rate of about 450 pounds per hour reckoned on the hydrogen chloride content. This wet gas passes upwardly through the packing in column 16 to come into intimate contact with the refrigerated acid solution and is dried thereby, the spray catcher section 18 removing any entrained droplets of acid before the anhydrous product leaves the top of the dehydrating column through product line 11. In passing through the column 16 countercurrently to the wet hydrogen chloride gas, the refrigerated acid solution increases in concentration with the result that at the bottom acid outlet 22 of the column, 1,046 pounds per hour of 43% acid are produced at about 58° F.

The column 20 is divided into a rectifying section 25 and a stripping section 26 each packed with berl saddles, for example. The 43% acid from the outlet 22 at the bottom of drying column 16 passes through a flow and level control device shown by a generalized representation at 28 through the line 29 to the inlet 30 near the top of the rectifying section. The inlet 30 of the rectifying section includes a suitable liquid distribution device 30a to ensure even wetting of the packing and proper flow of the acid as it descends through the rectifying section. A mixture of hydrogen chloride gas and a roughly equal amount of water vapor is delivered to the bottom of the rectifying section from stripping section 26 at about 230° F. and passes upwardly through the packing of the rectifying section against the counterflow of acid solution. A continuous refluxing action takes place to raise the concentration of hydrogen chloride in the ascending gas stream. Above the inlet 30 a spray catcher section 31 is provided to remove entrained liquid droplets before the wet hydrogen chloride gas passes, at about 65° F. with about 1% to 2% water vapor, from the column outlet 32 over line 33 to the inlet 21 of the dehydrating tower.

At the top of the stripping section 26 of column 20 the dilute acid flowing from the bottom of the rectifying section 25 at the rate of 745 pounds per hour of approximately 20% acid, that is, approaching azeotropic composition, is mixed in the mixing and distributing device 36 with hot calcium chloride solution introduced through inlet 37 at a rate of 3,980 pounds per hour at a temperature of 270° F. and containing 51% of calcium chloride by weight. In passing down the packed stripping section, the mixture of acid and calcium chloride solution meets a counterflow of steam, introduced through the steam inlet 38 at the bottom of the column at a rate of about 190 pounds per hour, which strips the hydrogen chloride gas from the solution. A mixture roughly equal in water vapor and hydrogen chloride is delivered at about 230° F. from the stripping section to the rectifying section.

The diluted calcium chloride solution flows from the outlet 39 at the bottom of the column through the calcium chloride line 40 to a pair of concentrators 41 and 42 arranged in series. The concentrators are here shown electrically heated. In the first concentrator 41 the calcium chloride is raised to 45% calcium chloride content and is delivered at a temperature of 256° F. to the second concentrator 42. The steam produced in concentrator 41 at a rate of 190 pounds per hour is returned through the steam inlet 38 at the bottom of column 20. Excess steam delivered to inlet 38 is most undesirable, as it will travel up the stripper and into the rectifying section. If the excess is great it will travel up into the gas dryer column 16. Automatic control of the temperature of the calcium chloride solution leaving concentrator 41 ensures against this hazard, by producing at concentrator 41 automatically the quantity of steam needed to remove as much of the hydrogen chloride gas content as the stripper as is practically possible by supplying heat to the liquids in the stripper to replace heat losses occurring therein.

In concentrator 42 the calcium chloride solution is raised to a concentration of 51% calcium chloride by weight and it is moved thence at a temperature of 270° F. by pump 46 over line 47 to the calcium chloride inlet 37 at the top of the stripper section at a rate of about 3,980 pounds per hour. The heaters 43 on the first concentrator preferably are controlled to cut off at 256° F. while the heaters 44 of the second concentrator are similarly controlled to a 270° cutoff. The steam produced by the second concentrator may be passed to a packed condenser and scrubber tower, being introduced to the top thereof with a parallel flow of water spray, the bottom of the tower being vented to the atmosphere and the condensate therefrom being passed to a sewer.

In this system for concentrating and re-cycling the calcium chloride solution, only a small concentration of hydrogen chloride is present in the calcium chloride solution delivered to the first concentrator as the stripping section when in operating equilibrium can readily be made to effect practically complete stripping. Of whatever hydrogen chloride is carried to the first concentrator by the calcium chloride solution, practically all is returned with the steam to the bottom of the stripping section so that the calcium chloride leaving the first concentrator contains only about .07% of hydrogen chloride. With a calcium chloride solution of 51% by weight leaving concentrator 41 the hydrogen chloride content drops to .015%.

The net operating figures for the system at equilibrium conditions of operation give 325 pounds per hour of dry hydrogen chloride gas at 20° F. for maximum production with the maximum rate of 22° Baumé muriatic acid introduced into the system of 921 pounds per hour at 90° F.

Instead of including the rectifying section 25 and stripping section 26 in one column it is, of course, obvious that the stripping section may be made a separate unit while the rectifying section 25 and the dehydrating column 16 are incorporated into a single column by superimposing the column 16 over the rectifying section. This may be done most simply merely by increasing the depth of packing in the dehydrating column to include the depth of the rectifying section. No essential change in the nature of the process is effected thereby for the incoming acid would still be refrigerated, and in the packed column incorporating both rectifier and dehydrator, the upper part would perform the dehydrating function with the lower part serving as rectifier.

Instead of refrigerating the muriatic acid feed and introducing it into the process at the top of the dryer column, the feed acid at room temperature may be put into the top of the rectifying section, while strong acid from the bottom of the dryer column is pumped through an acid refrigerating unit and into the top of the dryer as the dehydrating agent. The major part of the acid solution reaching the bottom of the dryer column is thus re-cycled through the refrigerator, with the balance passing into the top of the rectifying section as additional feed. This procedure has the decided advantage of not requiring refrigeration of large amounts of acid. In effect, the refrigeration capacity cools only the hydrogen chloride gas stream and, further, the refrigerated acid fed to the dryer column has a higher hydrogen chloride content. A system using this procedure is shown in Fig. 2, wherein like numerals are used to designate parts like to those of Fig. 1. In Fig. 2, however, the dryer column 16, rectifier column 25 and stripper column 26 are shown superimposed to form a single tower, while, as hereinafter described, there are also provided a product gas absorbing system, and a submerged combustion heating unit for the calcium chloride concentrator.

Muriatic acid is fed from the acid storage tank 9 through line 12 to the feed inlet 30 at the top of rectifier column 25 under control of feed valve 10. The delivery rate of product hydrogen chloride is determined by the acid feed rate and hence is controlled by the acid feed valve 10. The acid used as a drying agent is withdrawn from the outlet 22 at the bottom of dryer column 16 through line 14a, and is re-cycled through the acid cooler 13 back through line 14 to inlet 15 at the top of the dryer column by the re-cycling pump 13a. Here refrigeration is supplied the cooler by an automatically controlled gas refrigeration system including the refrigerator compressor and condenser 13b and 13c. When 45% acid is taken from the dryer column, refrigerated to 5° F. and re-cycled as the dehydrating agent, a product hydrogen chloride gas may be obtained as low as about 0.004% in water vapor content. When the dryer column is in operating equilibrium, moisture is continually abstracted from moist gas delivered from the top of the rectifier to the dryer through the dryer gas inlet 21a, and a corresponding volume of 45% acid overflows from the bottom of column 16 down the gas inlet 21a into the rectifier feed distributing tray 30a. The upper end of inlet 21a is capped with a plate, but radial slots beneath the plate are provided for gas passage and for dryer bottom acid overflow to the rectifier, the depth of the slots determining the level of the acid in the dryer column base.

By operating above atmospheric pressure, acid may be drawn from the dryer tower bottom at higher concentrations. Thus, with operation at 20 p. s. i. gage pressure, 51% acid and 52% acid may be obtained for acid refrigeration temperatures of 5° F. and 0° F. respectively. However, for operation at atmospheric pressure, refrigerated acid in the concentration range of approximately 31.5% to 49% is useful in practical operation, while a refrigeration temperature range of about 10° F. to 0° F. may be used.

The calcium chloride re-cycling system in Fig. 2 is basically the same as in Fig. 1, the hot concentrated solution being fed by pump 46 from pump tank 46a through 47 to the stripper inlet 37 for mixture with acid from the rectifier bottom in the mixing and distribution device 36. The weak calcium chloride solution arriving at the stripper bottom outlet 39 is carried over line 40 to the concentrator 41, whence the concentrated solution flows to the pump tank 46a for re-cycling.

The concentrator 41 is here heated by a submerged combustion burner 50 to which air supplied by compressor 51 and fuel gas are fed from the control mixer 52. The vapor from the concentrator is passed through concentrator vapor line 53 to the condenser 54 to flow upward through packing countercurrently to a flow of cooling water. Steam is not supplied the stripper column from the concentrator as in Fig. 1. The steam admitted through stripper steam inlet 38 is provided by an independent steam source through automatic controls (not shown), responsive to the stripper temperature, which regulate steam flow as required to compensate for heat losses through the walls of the equipment.

In order to keep the columns in operating equilibrium in the event that the product demand drops, a product hydrogen chloride absorber system is provided to absorb the dried gas in water and return it to the muriatic acid storage tank 9. By closure of product gas shut-off valve 11a, gas is diverted, as shown by the dashed arrows, down the large bore U-shaped gas by-pass line 60 and back up through the mist eliminator box 61 to the absorber tower 62.

To prevent gas from passing to the absorber during normal demand periods, an amount of water is provided in the by-pass line which will rise in the leg 60a of the U to a height sufficient to balance the gas pressure while still maintaining a water seal at the bottom of the U. The lower part of mist eliminator box 61 below the lateral inlet of line 60a has sufficient volume to receive the sealing liquid in line 60—60a, which is thrown by product gas pressure up out of the by-pass line 60—60a into the box 61 when product gas valve 11a is closed, thus opening the by-pass to the absorber system. A sealing liquid return line 63 allows a gradual return of the liquid from the box 61 to the bottom of the U. By suitable dimensioning for the gas volume and pressure handled, the by-pass sealing device may be made practically instantaneously responsive upon closure of the product gas valve 11a. Thus where the gas rate is about 4,500 pounds per hour, the use of a 12 inch by-pass line 60 with a 2 inch return line 63 is satisfactory. As long as the valve 11a is closed and gas is by-passed to the absorber, sealing liquid returning to the U is entrained and carried back to box 61, but after 11a is again opened upon resumption of normal product demand, the sealing liquid returns to lines 60 and 60a to re-establish the seal. Packing 61a in the box 61 prevents sealing liquid from escaping the sealing system.

The by-passed gas flows to the absorber column 62 for absorption in counter-descending water supplied through water lines 64 and 64a under regulation of the automatically controlled valve 65. The absorber column is cooled interiorly by cooling coils 66, while the acid produced is further cooled in returning to acid storage tank 9 by passage through the external cooler 67 in line 68. Water may be used as coolant in cooler 67. In order to produce muriatic acid of the strength desired for return to the acid storage tank, part of the acid from the absorber bottom is re-cycled to the top of the absorber through line 70 by absorber re-cycling pump 71 with a portion of the flow being diverted to control by-pass line 72 including an element 73 responsive to the re-cycled acid condition for control and operation of water valve 65.

In a system such as that of Fig. 2, producing 4,500 pounds per hour of dry gas, the 45% acid is re-cycled at a rate of 20,000 pounds per hour at 5° F. through a cooler 13 having a refrigerating capacity of 120,000 B. t. u. per hour, while 14,570 pounds per hour of 20° Baumé (32%) acid is required for feed, at a nominal 70° F. The stripper requires 6,370 pounds per hour of steam at 210 p. s. i. gage and 114,590 pounds per hour of 56% calcium chloride solution at 253° F. for operation at 12 p. s. i. gage, and hence delivers 130,960 pounds per hour of 49% calcium chloride solution at 282° F. to the concentrator. For the concentrator unit about 20,500 cubic feet per hour of natural gas are required (representing about 14,400,000 B. t. u. net) which results in the production of about 14,000 cubic feet per minute of vapor at about 260° F. to be handled by the condenser. Due to the use of the submerged combustion heating unit, the 56% calcium chloride has an apparent boiling point of 253° F., about 30° below normal. The net loss of hydrogen chloride represents less than 0.5% of that contained in the feed and the normal cost of refrigerating the re-cycled 45% acid is lower than the cost of sulphuric acid alone which is normally required in the usual sulphuric acid dehydrating system.

The process above described has the advantage, in addition to those already appearing, that the equipment used in carrying it out is readily adapted to the production of strong acid from weak acid, which results in considerable freight savings for a given amount of hydrogen chloride transported. Thus a portion of the weak acid may be fed into the rectifier column to furnish a wet hydrogen chloride gas, which is then absorbed in weak acid passed through the acid cooler and the dryer column to produce fortified acid available at the dryer column bottom in concentrations as high as 40% hydrogen chloride if desired.

The materials of construction for the fabrication of the equipment used may be any of the materials heretofore known to the art as suitable for handling the various acid and salt solutions involved in the different operations of the process, such as berl saddles or vitrified porcelain for packing, vitrified stoneware, steel towers with acid-proof membrane and acid-proof brick linings, with the control devices and distributing devices in the various columns being of constructions and types commonly used. Neutralization of the calcium chloride solution can be omitted where a submerged combustion burner is used having those parts subject to corrosion by the solution made of graphite. In order to maintain the systems above described in operating equilibrium despite variations in the demand for anhydrous hydrogen chloride gas, the systems may be maintained in operation at substantially full capacity, while the gas in excess over demand is diverted, as necessary, to a gas absorption system, such as that shown in Fig. 2, in which the anhydrous gas is absorbed by water in a tower interiorly cooled to form a hydrochloric acid solution of 22° Baumé concentration, which may then be further cooled externally and returned to the acid storage tank used to supply the muriatic acid fed into the system.

I claim:

1. A process for the production of dry hydrogen chloride gas from an aqueous solution of hydrogen chloride which comprises refrigerating a stream of aqueous hydrogen chloride solution having a hydrogen chloride concentration over 32 percent by weight to a temperature within the range from 10° F. to 0° F.; drying a moist hydrogen chloride gas stream produced at another subsequent step of the process by bringing the moist gas stream into intimate contact with the refrigerated solution as a drying agent, whereby there is produced a dry hydrogen chloride product gas; passing a gas stream of hydrogen chloride and water vapor produced at a subsequent stripping step of the process through an aqueous hydrogen chloride solution to produce said moist hydrogen chloride gas stream and an hydrogen chloride solution approaching azeotropic composition; stripping the hydrogen chloride from the last said hydrogen chloride solution by admixing thereto a hot concentrated aqueous solution containing over 51 weight percent calcium chloride at a temperature over 270° F. and passing steam through the mixture, thereby to produce said gas stream of hydrogen chloride and water vapor; reconcentrating the calcium chloride solution resulting from the preceding stripping step by evaporation for re-cycling for use in said stripping step and utilizing a part of the steam resulting from the reconcentrating step to supply the steam for said stripping step.

2. A process for the continuous production of dry hydrogen chloride gas from an aqueous solution of hydrogen chloride which comprises refrigerating a stream of aqueous hydrogen chloride solution of over 31.5 weight percent hydrogen chloride concentration to a temperature at least as low as 10° F.; drying a stream of moist hydrogen chloride gas resulting from a subsequent step in the process by passing the refrigerated solution and said moist hydrogen chloride gas in intimate contact through a dryer column to produce a dry hydrogen chloride product gas; passing an aqueous hydrogen chloride solution through a rectifying tower countercurrently to a hot gaseous mixture of water and hydrogen chloride to produce the said stream of moist hydrogen chloride gas and a residual hydrogen chloride solution; stripping the hydrogen chloride from the residual hydrogen chloride solution produced by said rectifying tower by admixing thereto a hot aqueous solution containing at least 51 weight percent calcium chloride and passing the mixture through a stripping tower countercurrently to steam thereby producting said hot gaseous mixture of water and hydrogen chloride and a less concentrated solution of calcium chloride.

3. In a process for the production of dry hydrogen chloride gas the steps of refrigerating to 10° F. an aqueous solution of at least 31.5 weight percent of hydrogen chloride and passing the refrigerated solution through a drying tower in intimate contact with and countercurrently to a stream of moist hydrogen chloride gas to produce a stream of dried hydrogen chloride gas.

4. In the production of dry hydrogen chloride gas the steps of refrigerating an aqueous solution containing at least 31.5 weight percent of hydrogen chloride to a temperature within the range of about 0° F. to about 10° F. and passing the refrigerated solution into intimate contact with a stream of moist hydrogen chloride gas to produce a stream of dried hydrogen chloride gas.

5. A process such as that described in claim 2 wherein hydrogen chloride solution is drawn from the bottom of the dryer column, refrigerated and returned to the dryer column to serve as the drying agent.

References Cited in the file of this patent

UNITED STATES PATENTS

| | | |
|---|---|---|
| 1,892,652 | Heath | Dec. 27, 1932 |
| 1,897,996 | Barstow et al. | Feb. 21, 1933 |
| 1,906,467 | Heath | May 2, 1933 |
| 2,227,953 | Baehr et al. | Jan. 7, 1941 |
| 2,437,290 | Bottenberg et al. | Mar. 9, 1948 |
| 2,463,188 | Latchum | Mar. 1, 1949 |
| 2,463,453 | Beardsley | Mar. 1, 1949 |
| 2,553,557 | Dunning | May 22, 1951 |